March 31, 1959     D. A. FEIGLEY, JR     2,880,090
ASBESTOS-BACKED PLASTIC SURFACE COVERING
Filed Nov. 20, 1956
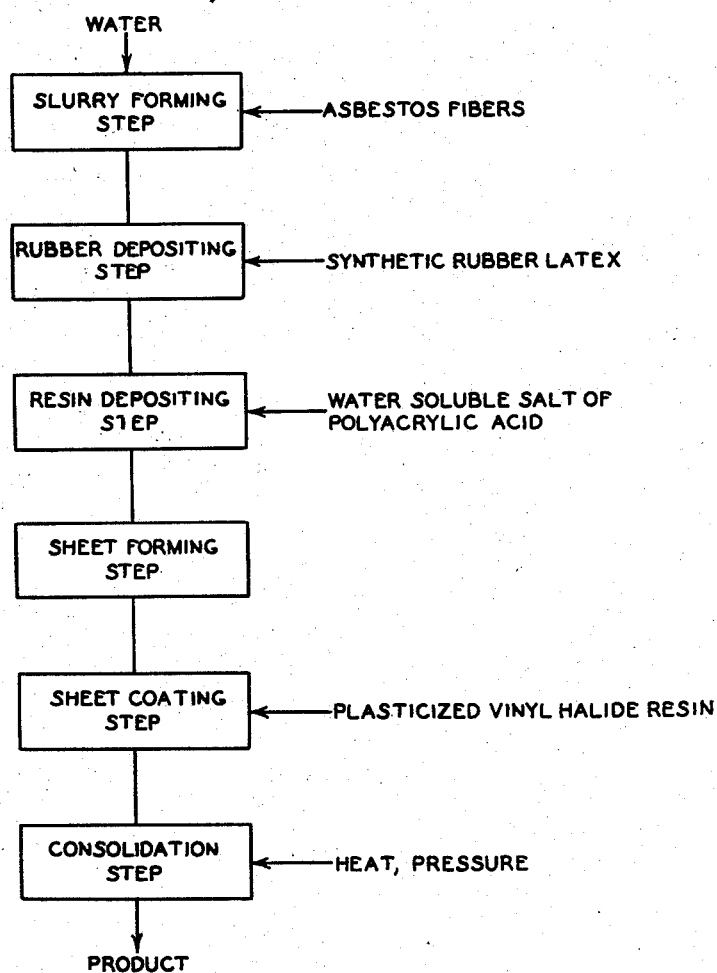
INVENTOR
DAVID A. FEIGLEY, JR.
ATTORNEY

2,880,090
ASBESTOS-BACKED PLASTIC SURFACE COVERING

David A. Feigley, Jr., Lancaster Township, Lancaster County, Pa., assignor to Armstrong Cork Company, Lancaster, Pa., a corporation of Pennsylvania Application November 20, 1956, Serial No. 623,314

20 Claims. (Cl. 92—3)

This invention relates generally to surface covering materials. More particularly, the invention relates to surface covering materials having a flexible sheet backing and a decorative wear-resistant surface layer. Still more particularly, the invention relates to a surface covering material having a backing of coated asbestos fibers on which is firmly affixed a polymerized vinyl halide resin composition.

It is known to prepare a flexible surface covering material having a felted sheet as a backing and a vinyl composition as a decorative wear-resistant surface. It would appear that the use of asbestos fibers in the backing would not produce undue problems in the production of such a surface covering material as opposed to the use of backings which contain the ordinary cellulosic fibers. However, such is not the case.

It has been found that the use of felted asbestos sheeting as a backing for vinyl compositions introduces processing difficulties which are not completely understood. During the heating and pressing cycle wherein the vinyl composition laid on the surface of the asbestos sheet is fused and adhered to the asbestos sheet, undue blistering and bubbling of the vinyl resin composition is encountered. Such blistering is not found when the more normal cellulosic felted backings are used. Several expedients have been attempted to eliminate this blistering. None of these expedients has been completely successful for reasons which escape explanation.

Accordingly, it is the primary object of the present invention to supply a product and the method of making the product whereby the above-described blistering phenomenon is eliminated. It is a further object of the present invention to supply a product and a method which may be utilized on normal plastic flooring production lines even though felted sheet asbestos is used as a backing.

These objects are accomplished in a surprisingly effective manner. The invention contemplates a surface covering material comprising in combination a flexible sheet backing and a decorative wear-resistant surface. The backing comprises felted asbestos fibers having deposited thereon a first inner coating of a synthetic rubber binder and a second outer coating of a magnesium salt of polyacrylic acid. The decorative wear-resistant surface is a homogeneous mixture comprising a polymerized vinyl halide resin and plasticizer for the resin. Mineral filler will often be included.

In the drawing:

Figure 1 is a flow diagram of the process for preparing the product of the invention.

Figure 2 is a vertical sectional view of the product embodying the present invention.

The present invention results from the surprising and unexpected discovery that a particular treatment of the asbestos fibers which form part of the backing affects the vinyl composition which makes up the wearing surface on the final product. It is not to be predicted that a coating of a certain chemical compound in combination with the other ingredients which make up a felted sheet backing could eliminate objectionable manufacturing difficulties which occur on the face of the final product; the face would normally appear to be unaffected by the composition of the backing.

Thus the backing itself is a critical portion of the product of the present invention. The backing may generally be described as being a flexible felted sheet product of water-laid asbestos fibers. The backing will be prepared by a beater saturation technic.

The asbestos fibers will be taken up in water to form a slurry having about 0.5%–3% consistency. Preferably the consistency will be about 1%. The slurried fibers may be refined by a jordan engine or beater to produce the desired degree of mechanical refinement. After the slurry has been formed and refined, a synthetic rubber latex will be added to the slurry and the rubber content of the latex will be deposited onto the fibers with agitation.

The rubberlike binder employed in the practice of this invention may be any of a number of synthetic rubbers used in the practice of conventional beater saturation methods. Typical of these synthetic rubbers are the products known as "GR–S," which is a copolymer of butadiene and styrene containing about 50% to about 70% butadiene; nitrile rubbers, which are copolymers of butadiene and acrylonitrile containing about 55% to about 80% butadiene; and neoprene, which is a polymer of 2-chlorobutadiene-1,3, generally referred to as polychloroprene. If desired, homopolymers of butadiene may be employed as well as homopolymers and/or copolymers of butadiene homologues such as isoprene. These materials can be generally designated as synthetic rubbers, and more specifically designated as rubberlike polymers of butadiene, isoprene, and chloroprene, and rubberlike polymers of butadiene or isoprene with copolymerizable vinyl compounds such as styrene and acrylonitrile. Mixtures of synthetic rubbers can be used. As is well-known in beater saturation methods, these synthetic rubbers are added to the slurry in the form of a latex. These latices normally contain about 25% to about 40% solids. Such latices contain additional compounding ingredients such as stabilizers and the like which are well-known in the art and which form no part of this invention.

Since the felted sheet backing of the present invention is made of asbestos fibers, it is preferred that the synthetic rubber binder be deposited on the fibers with the aid of certain sequestering or chelating agents which are added to the slurry prior to the addition of the synthetic rubber latex which is to be coagulated to form the binder of the asbestos sheet material. These sequestering agents apparently form a nonionizing complex with the metallic ions present in the water and thereby prevent partial precipitation of the binder solids before the desired mixing of the latex and the fibers can be obtained. The sequestering agents used are selected water-soluble polycarboxylic acids and/or water-soluble salts thereof. These polycarboxylic acids are tricarboxylic acids such as citric acid and tetracarboxylic acids such as ethylene diamine tetraacetic acid. Examples of the water-soluble salts of such acids which may be used are the alkali metal salts such as sodium, potassium, and lithium of the acids set forth above. Generally speaking, particularly advantageous results are obtained when the sodium salts of the selected polycarboxylic acids are employed. The sodium salts maintain the pH of the water slurry neutral or slightly alkaline and thus enhance its compatibility with anionic latices normally employed in the beater saturation process. The deposition of synthetic rubber binders on asbestos fibers for the purpose of sheet formation is more fully set forth in United States Patent No. 2,759,813, issued August 21, 1956.

Following the deposition of the synthetic rubber binder on the asbestos fibers, there is added to the slurry of coated fibers a water-soluble salt of polyacrylic acid. The polyacrylic acid should have a molecular weight in the range of about 5,000–20,000, with 10,000 being preferred. It will be added in the form of a water-soluble alkali metal, ammonium, or other water-soluble salt of polyacrylic acid, the salt being used in order to render the polymer water-soluble. These polymers are prepared in known ways, either by the polymerization of the sodium salt of acrylic acid or by the neutralization of polyacrylic acid. The polyacrylic acid salts are normally sold as latex stabilizers and film formers. However, it has now been discovered that they do not serve any useful role in beater saturation processes if they are added after mechanical refining and before the addition of a binder system to the slurry. If the polyacrylic acid salts are present in the slurry when the rubber latex is introduced, the salts interfere with the deposition of the latex and have no effect in eliminating the blistering of the vinyl resin surface composition during processing.

Accordingly, it is important and critical that the polyacrylic acid salts be added to the slurry subsequent to the deposition of the synthetic rubber binder on the fibers. This order of addition will result in a first inner coating on the fibers of the synthetic rubber binder and a second outer coating of a polyacrylic compound.

The amounts of the water-soluble polyacrylic salts to be added to the slurry will generally range from about 0.5% to about 2% by weight based on the weight of the asbestos being used, that is, based on the total dry weight of the fibers. Amounts less than about 0.5% by weight do not yield useful results, and amounts greater than about 2% by weight give no further improvement in the elimination of the blistering phenomenon on the wear surface during processing.

Since asbestos fibers are the fibers to be used in the backing called for by the present invention, it will be unnecessary to add additional polyvalent metal ion in order to precipitate the polyacrylic acid onto the coated fibers. This is true because slurries containing asbestos fibers will already contain sufficient magnesium ion to accomplish the precipitation. Thus the mere addition of the water-soluble salt of polyacrylic acid will suffice to bring about precipitation of the magnesium salt of polyacrylic acid onto the rubber-coated fibers.

After the precipitation of the magnesium salt of the polyacrylic acid onto the rubber-coated fibers, the resulting slurry is then formed into a sheet on conventional paper-making equipment such as a Fourdrinier wire or a cylinder machine. Drying of the sheets will generally be accomplished in the drying section of the paper machine. The sheets are then ready to be used as a backing for a plastic flooring.

The decorative wear-resistant surface to be fabricated onto the backing as an integral part thereof is a homogeneous mixture comprising a polymerized vinyl halide resin and a plasticizer.

The polymerized vinyl halide resin is preferably a polymerized vinyl chloride resin. Examples of such resins are the polyvinyl chlorides and the vinyl chloride-vinyl acetate copolymers used in the plastic flooring art. These are the low-to-medium molecular weight polymerized vinyl halides available in commerce. Exemplary of the straight polyvinyl chloride resins suitable in the present invention are those designated as "Geon 121" and "Geon 126." Examples of the polymerized vinyl chlorides which are vinyl chloride-vinyl acetate copolymers are those designated as VYMF, VYNW, VYVF (copolymer of vinyl chloride containing about 3%–5% vinyl acetate), VYHH (vinyl chloride copolymer containing about 13% vinyl acetate), and mixtures thereof. The most significant property of the polymeric vinyl chloride used herein is that of yielding a hard, tough, yet sufficiently flexible wearing surface when treated as described below.

The resin must be plasticized. The plasticizer must be compatible with the polymeric vinyl chloride resin. Although the preferred plasticizer is dioctyl phthalate, other plasticizers such as butyl octyl phthalate, butyl benzyl phthalate, tricresyl phosphate, and the epoxidized fatty acids derived from drying and semidrying oils may also be used.

The plasticizer is incorporated into the polymeric vinyl chloride resin by means known in the art. The resin is placed in a Banbury mixer or on a mill and the plasticizer is simply added thereto. Generally about 15%–40% by weight plasticizer based on the weight of the polymeric vinyl chloride will be used. Depending upon the particular resin and plasticizer used, the blending will generally be carried out at a temperature in the range of about 260°–330° F.

The resin-plasticizer blend should preferably contain a stabilizer to minimize degradation of the polymeric vinyl chloride resin by heat and light. Examples of such stabilizers are the organo-tin-sulfur complexes sold under the name Advance 17M, Thermolite 31, and the organo-tin compound sold under the name Thermolite 99. Additionally, the cadmium soaps such as cadmium octalate sold under the name V-122, and barium soaps, and barium-cadmium soaps may be used as stabilizers. The stabilizers are generally incorporated in the blend in an amount of about 0.1%–1% by weight based on the weight of the polymeric vinyl chloride.

Mineral filler will also be used in many applications. Such fillers may be ground limestone, which is preferred, silica, clay, asbestos, and the like. The filler is incorporated simply by adding it to the resin in the Banbury or on the mill. Generally the amount of filler will vary between about 10%–80% by weight of the total composition.

Suitable pigments and/or dyes may be added in order that the composition may possess the desired color. The amount of dye or pigment will generally be less than about 8% by weight of the total mix. It will be appreciated that the amount of pigment or dye to be added will be largely dependent on the nature of the pigment or dye.

Once the resin-plasticizer-filler mixture, containing stabilizers and pigments as desired, is well blended, it is then sheeted out on a mill. After cooling, the sheet is passed through a dicing machine or other device suitable for forming particles from the cooled sheet. It is preferred that the sheet be diced into small squares, which squares may vary in size depending on the particular pattern desired in the final product. The squares may measure as much as 1" x 1" or as small as ⅛" x ⅛". Many of the current patterns call for a size of ¼" x ¼", and this is the preferred size. The thickness of the diced squares will be dependent on the thickness of the sheet that passes to the dicer and will generally be in the range of 0.010"–0.100".

Some pattern effects, however, call for much smaller irregularly shaped particles. These particles are easily produced by passing the diced squares to a grinding device such as a Fitzpatrick mill or Cumberland grinder. Since the particles are to be deposited on the asbestos backing, it is preferred that such particles all be of substantially the same size. Accordingly, if the particles are to be ground or otherwise reduced to smaller particles having irregular shapes, it is preferred that the particles be screened in order that the particles to be deposited on the asbestos backing be of substantially the same size. For surface covering purposes, the irregularly shaped particles used in any one pattern will generally be in the size range of 18–2 mesh.

Diverse pattern effects may be achieved by admixing particles, each of which has a different color. For example, a plastic flooring may be prepared wherein white particles comprise some 50% by weight of the total particles, blue particles comprise some 30% by weight, and red particles comprise some 20% by weight. The pattern effects achieved by admixing a few or many different-colored particles are almost unlimited. Any suitable blender may be used to uniformly distribute the individual colored particles throughout the total mass of particles. If a single color is desired in the final product, then particles of only one color will be used.

The particles may be deposited on the asbestos backing in a continuous manner by passing the felt beneath a suitable repository for the particles. A doctor roll or a doctor blade may be used to aid in the even distribution of the particles on the backing. Additionally, it is advantageous to vibrate the backing by passing it over a vibrating steel plate. This serves to shake the particles down and form a more compact layer of particles on the backing.

The backing, together with the layer of particles deposited thereon, will then pass beneath radiant heaters in order to preheat and soften the polymeric vinyl chloride resin particles. A preferred modification is such that the particles are heated to a temperature in the range of about 330°–400° F., with an average temperature throughout the thickness of the layer of particles of about 350° F. It will be appreciated that the temperatures, and particularly the temperature gradient, will depend to some extent on the thickness of the layer of the particles. This thickness will generally be in the range of about 0.010″–0.350″, with a preferred thickness in the range of about 0.060″–0.100″.

After being preheated, the layers of particles are consolidated with each other and with the asbestos backing by passing the backing-particles system through a flat bed press. The press will have a width equal to that of the backing which carries the particels. The press is preferably maintained at a temperature of about 350° F. and applies a maximum pressure to the system of about 1400 pounds per square inch. Pressing time will vary according to the particular press used, but it has been found that an instantaneous pressure of about 1400 pounds per square inch at a temperature of about 350° F. accomplishes the necessary consolidation of the particles and the backing. To prevent the surface of the fused particle layer from adhering to the press platen, it is necessary that a suitable release paper be interposed between the fused polymeric vinyl chloride surface and the surface of the press.

It is at this point that the unexpected properties of the product of the present invention become peculiarly manifest. Where the asbestos fibers do not carry that second coating of the magnesium salt of polyacrylic acid described earlier, the product as it emerges from the flat bed press often has a blistered, mottled, and irregular appearance that renders the product unusable. The precipitation of the magnesium salt of the polyacrylic acid eliminates these defects from the vinyl wearing surface. Asbestos sheeting possesses completely different characteristics in the manufacture of floor coverings from cellulosic sheeting, and hence the asbestos sheeting demanded experimentation before it could be introduced into the standard plastic flooring proccesses. Such experimentation brought to light the blistering problem. Solution of the problem by the addition of a coating of the magnesium salt of polyacrylic acid on the rubber-coated asbestos fibers was completely unexpected since the resulting increase in tensile strength of the asbestos sheet does not supply the entire answer.

Once the pressing step is completed, the backing-fused vinyl resin system passes out of the press, where it is cooled, the release paper is stripped off, and the final product disposed into rolls ready for the market.

The following examples illustrate several embodiments of the present invention. All parts are by weight unless otherwise stated.

Example I

Asbestos fibers were taken up in water and treated with agitation with the following ingredients in the order shown.

| Ingredients: | Parts |
| --- | --- |
| Water | 3750 |
| Asbestos (5D) | 37.5 |
| Sodium citrate | 0.75 |
| Sym. di-beta-naphthyl-p-phenylene diamine (48% dispersion) | 0.15 |
| Butadiene-styrene copolymer latex (50% butadiene), 40% | 18.8 |
| Alkyl aryl sulfonate, 10% aqueous solution dispersing agent (to rubber latex) | 0.5 |
| Sodium salt of polyacrylic acid, 5% aqueous solution, molecular weight, 10,000 | 7.5 |

A sheet of a thickness of 0.039″ was formed and dried.

Example II

Sheets were prepared as in Example I save that instead of the butadiene-styrene copolymer latex, there was used in one case the butadieneacrylonitrile copolymer designated as "Hycar 1561." In the other case there was used instead of the butadiene-styrene copolymer latex a 39% solids latex of polychloroprene (Neoprene 735).

Excellent asbestos sheets resulted in each case.

Example III

A series of charges was prepared in a Banbury mixer, each charge utilizing a different pigment and hence possessing a different color. The formula for each charge was as follows:

| Ingredients: | Parts |
| --- | --- |
| Vinyl chloride - vinyl acetate copolymer (VYNW) | 620 |
| Dioctyl phthalate | 150 |
| Barium-cadmium laurate | 27 |
| Ground limestone | 1034 |
| Pigment | 30 |

Mixing in the Banbury was carried out at 325° F. The Banbury mix was discharged to an 84″ mill having roll temperatures in the range of 220°–285° F. The mix was formed into a sheet, cooled, and diced into particles measuring ¼″ x ¼″. The diced particles were then passed through a Cumberland mill to form granulated particles, which were then screened through a screen having 0.080″ screen openings.

A series of products was prepared by laying up the particles prepared as described above on asbestos sheet backings prepared as in Examples I and II. The particles were deposited evenly over the asbestos sheet to a thickness of about 0.095″. Next the asbestos sheet carrying the layer of particles was passed beneath radiant heaters whereby the layer of heated particles was heated to an average temperature of 350° F.

The preheated system was then pressed at a temperature of 350° F. with an instantaneous pressure of 1400 pounds per square inch; release paper was used to prevent adhesion of the fused vinyl wearing surface to the press platen.

On removal of the system from the press, and cooling, a smooth, highly polished, attractive wearing surface integrally united with the asbestos backing was noted. Similar products prepared as described in this example, with the sole exception that the polyacrylic acid treatment of the rubber-coated asbestos fibers in the asbestos sheet backing was omitted, presented a mottled, blistered, and unattractive surface. The blistered products were also more difficult to cut to shape with a linoleum knife than were the products made with the polyacrylic acid treatment.

I claim:

1. A hard-surfaced, flexible surface covering material comprising in combination a flexible sheet backing and a decorative wear-resistant surface, said backing comprising felted asbestos fibers having deposited thereon a first inner coating of a synthetic rubber binder and a second outer coating of a magnesium salt of polyacrylic acid, said decorative wear-resistant surface comprising a homogeneous mixture of a polymerized vinyl halide resin and plasticizer for said resin.

2. A surface covering material according to claim 1 wherein said synthetic rubber comprises butadiene-styrene copolymer.

3. A surface covering material according to claim 1 wherein said synthetic rubber comprises butadiene-acrylonitrile copolymer.

4. A surface covering material according to claim 1 wherein said synthetic rubber comprises polychloroprene.

5. A surface covering material according to claim 1 wherein said synthetic rubber is present in an amount of about 20%–30% by weight based on the dry weight of said asbestos fibers.

6. A surface covering material according to claim 5 wherein said synthetic rubber is present in an amount of about 20% by weight based on the dry weight of said asbestos fibers.

7. A surface covering material according to claim 1 wherein said salt of polyacrylic acid is present in an amount of about 0.5%–2% by weight based on the dry weight of said asbestos fibers.

8. A surface covering material according to claim 1 wherein said polymerized vinyl halide resin comprises polyvinyl chloride.

9. A surface covering material according to claim 1 wherein said polymerized vinyl halide resin comprises a vinyl chloride-vinyl acetate copolymer.

10. A hard-surfaced, flexible surface covering material comprising in combination a flexible sheet backing and a decorative, wear-resistant surface, said backing comprising felted asbestos fibers having deposited thereon about 20% by weight based on the dry weight of said fibers of a first inner coating of a butadiene-styrene copolymer and about 0.5%–2% by weight based on the dry weight of said fibers of a second outer coating of a magnesium salt of polyacrylic acid having a molecular weight of about 10,000, said decorative, wear-resistant surface comprising a homogenous mixture of a vinyl chloride-vinyl acetate copolymer, plasticizer for said copolymer, and finely divided calcium carbonate filler.

11. The method of making a surface covering material which comprises forming a slurry of asbestos fibers in water, whereby said fibers release magnesium ions into said water, depositing a synthetic rubber binder on said fibers to form rubber-coated fibers, adding to the resulting slurry a water-soluble salt of polyacrylic acid, whereby the magnesium salt of said polyacrylic acid deposits on said rubber-coated fibers, forming the resulting slurry of coated fibers into a sheet, depositing on said sheet a layer of particles, said particles comprising a homogeneous mixture of a polymerized vinyl halide resin and plasticizer for said resin, and subjecting said layer on said sheet to heat and pressure to fuse said particles and to adhere said layer to said sheet, whereby a smooth, hard, flexible wearing surface is formed.

12. The method according to claim 11 wherein said synthetic rubber is deposited on said fibers in an amount of about 20%–30% by weight based on the dry weight of said fibers.

13. The method according to claim 11 wherein said synthetic rubber binder comprises a butadiene-styrene copolymer.

14. The method according to claim 11 wherein said synthetic rubber comprises a butadiene-acrylonitrile copolymer.

15. The method according to claim 11 wherein said synthetic rubber comprises polychloroprene.

16. The method according to claim 11 wherein said salt is added in an amount of about 0.5%–2% by weight based on the dry weight of said fibers.

17. The method according to claim 11 wherein said polymerized vinyl halide resin comprises polyvinyl chloride.

18. The method according to claim 11 wherein said polymerized vinyl halide resin comprises vinyl chloride-vinyl acetate copolymer.

19. The method according to claim 11 wherein said homogeneous mixture comprises vinyl chloride-vinyl acetate copolymer, dioctyl phthalate, and finely divided calcium carbonate.

20. The method according to claim 11 wherein said polyacrylic acid has a molecular weight of about 10,000.

References Cited in the file of this patent

UNITED STATES PATENTS

| | | |
|---|---|---|
| 1,976,679 | Fikentscher et al. | Oct. 9, 1934 |
| 2,133,693 | Greider et al. | Oct. 18, 1938 |
| 2,315,675 | Trommsdorff | Apr. 6, 1943 |
| 2,430,934 | Kemmler et al. | Nov. 18, 1947 |
| 2,759,813 | Feigley | Aug. 21, 1956 |
| 2,769,726 | Wetterau et al. | Nov. 6, 1956 |
| 2,774,685 | Carnegie | Dec. 18, 1956 |